(12) United States Patent
Nagao et al.

(10) Patent No.: US 7,322,557 B2
(45) Date of Patent: Jan. 29, 2008

(54) CHEMICAL LIQUID CONTROL VALVE

(75) Inventors: Toshiyuki Nagao, Komaki (JP); Shigeru Osugi, Komaki (JP); Hiroshi Tomita, Komaki (JP)

(73) Assignee: CKD Corporation, Komaki-Shi (JP)

( * ) Notice: Subject to any disclaimer, the term of this patent is extended or adjusted under 35 U.S.C. 154(b) by 0 days.

(21) Appl. No.: 11/417,133

(22) Filed: May 4, 2006

(65) Prior Publication Data

US 2006/0196577 A1 Sep. 7, 2006

Related U.S. Application Data

(63) Continuation of application No. PCT/JP2004/017057, filed on Nov. 17, 2004.

(30) Foreign Application Priority Data

Dec. 1, 2003 (JP) .............................. 2003-401938

(51) Int. Cl.
*F16K 31/44* (2006.01)

(52) U.S. Cl. ..................... 251/63.5; 251/118
(58) Field of Classification Search ................. 251/62, 251/63, 63.5, 118, 205, 331, 359
See application file for complete search history.

(56) References Cited

U.S. PATENT DOCUMENTS

| | | | | |
|---|---|---|---|---|
| 814,402 | A * | 3/1906 | Simpson | ........................ 210/385 |
| 1,471,229 | A * | 10/1923 | Williston | ................ 137/533.31 |
| 2,727,529 | A * | 12/1955 | Gustav | ........................ 137/469 |
| 2,792,015 | A * | 5/1957 | Smith | ........................ 137/469 |
| 4,624,444 | A * | 11/1986 | Johnson | ........................ 251/121 |
| 5,964,446 | A * | 10/1999 | Walton et al. | ................ 251/127 |
| 6,092,782 | A | 7/2000 | Yamada et al. | |
| 6,095,193 | A | 8/2000 | Kanzaka et al. | |
| 6,098,623 | A | 8/2000 | Lindqvist | |
| 6,289,934 | B1 * | 9/2001 | Welker | ........................ 138/39 |
| 2002/0092571 | A1 | 7/2002 | Misumi | |
| 2003/0102032 | A1 | 6/2003 | Fukano et al. | |

FOREIGN PATENT DOCUMENTS

| | | |
|---|---|---|
| JP | A 59-140967 | 8/1984 |
| JP | A 05-272648 | 10/1993 |
| JP | A 09-133252 | 5/1997 |
| JP | A 10-089494 | 4/1998 |
| JP | A 10-089528 | 4/1998 |
| JP | A 10-318423 | 12/1998 |
| JP | A 11-030355 | 2/1999 |
| JP | B2 2896747 | 3/1999 |
| JP | A 11-153235 | 6/1999 |
| JP | A 11-210927 | 8/1999 |
| JP | A 2002-213639 | 7/2002 |
| JP | A 2002-310316 | 10/2002 |
| JP | A 2004-019756 | 1/2004 |

\* cited by examiner

*Primary Examiner*—Gregory Huson
*Assistant Examiner*—John K. Fristoe, Jr.
(74) *Attorney, Agent, or Firm*—Oliff & Berridge PLC

(57) ABSTRACT

A chemical liquid control valve is provided with a barrier on an outer circumferential end portion of a protruding part (an outer circumferential bottom portion of a valve seat). The barrier is placed so that an angle between the center line of an outlet passage and the line extending between the center of a valve port and each end of the barrier. The barrier is designed to have a height relative to a contact surface of the valve seat with a valve element is substantially half of the travel distance of a diaphragm valve element.

4 Claims, 18 Drawing Sheets

CHEMICAL LIQUID CONTROL VALVE

CROSS-REFERENCE TO RELATED APPLICATIONS

This application is a continuation application based upon and claims the benefit of the prior PCT International Patent Application No. PCT/JP2004/017057 filed on Nov. 17, 2004, the entire contents of which are incorporated herein by reference.

BACKGROUND OF THE INVENTION

1. Field of the Invention

The present invention relates to a chemical liquid control valve for controlling supply of a chemical liquid.

2. Description of Related Art

In a CMP (Chemical Mechanical Polishing) process for semiconductor manufacture, wafers are polished by use of a chemical liquid (slurry) containing abrasive particles. Specifically, the wafers are rotated and polished with slurry supplied at a constant amount to the wafers under rotation. One of control valves for controlling the supply of slurry is e.g. a control valve disclosed in Jpn. unexamined patent publication No. 2002-310316.

A schematic configuration of this control valve is shown in FIG. 19. A control valve 120 includes an actuator 103 having a cover 101 and a cylinder tube 102, and a body 121 to which the actuator 103 is fixed. The body 121 is formed with a first hole 109 and a second hole 110, concentrically formed, which serve as an inlet port and an outlet port for fluid respectively, and further a flow passage 111 communicated with the first hole 109, as shown in FIG. 19. Provided on the end of a protruding part 112 centrally forming the flow passage 111 is a valve seat 113 having a valve port 113a communicated with the flow passage 111. A communication passage 122 is spirally formed around the protruding part 112 to allow communication between the valve port 113a and the second hole 110.

With the above structure, the control valve 120 can reduce the occurrence of an accumulation area near the inner wall of the communication passage 122 and also a turbulence area near the valve seat 113.

SUMMARY OF THE INVENTION

Although the control valve 120 disclosed in the above Jpn. '316 publication can prevent the occurrence of the accumulation part near the inner wall of the communication passage 122 and also a turbulence area near the valve seat 113, it has a problem that the abrasive particles in the slurry could not be dispersed during supply of the slurry. The same problem is found in other control valves other than the one disclosed in the Jpn. '316 publication. In other words, there has conventionally been no control valve provided with any measure for dispersing abrasive particles in the slurry without aggregating the particles.

The abrasive particles in slurry tend to aggregate or cling together. In the supply of slurry with the conventional control valve, therefore, there is a high possibility that the abrasive particles in the slurry aggregate. When the abrasive particles have aggregated into large-diameter particles, the particles of large-diameter would be supplied to the wafers. The wafer polishing may cause serious defects of wafers (which are damaged, namely, "scratched"), which leads to a decrease in production yield. Further, the aggregated abrasive particles may be deposited and accumulated in the control valve and pipes. This may cause clogging in the control valve and pipes.

The present invention has been made to solve the above problems and has a purpose to provide a chemical liquid valve for controlling supply of a chemical liquid including particles such as abrasive particles and adapted to disperse the particles of the chemical liquid without aggregating the particles.

To achieve the purpose, the invention provides a chemical liquid control valve for controlling supply of a chemical liquid, comprising: an inlet passage and an outlet passage; a protruding part centrally formed with a first communication passage communicated with the inlet passage; a valve seat provided at an end of the protruding part, the valve seat being formed with a valve port communicated with the first communication passage; a second communication passage provided around the protruding part and allowing communication between the valve port and the outlet passage; a valve element which is brought into/out of contact with the valve seat; and a barrier provided on an outer circumferential end portion of the protruding part.

According to another aspect, the present invention provides a chemical liquid control valve for controlling supply of a chemical liquid, comprising: an inlet passage and an outlet passage; a protruding part centrally formed with a first communication passage communicated with the inlet passage; a valve seat provided at an end of the protruding part, the valve seat being formed with a valve port communicated with the first communication passage; a second communication passage provided around the protruding part and allowing communication between the valve port and the outlet passage; and a valve element which is brought into/out of contact with the valve seat; wherein the valve element is provided, on its lower surface, with a dispersion member for dispersing the chemical liquid to a whole area around the valve element when the chemical liquid is supplied from the first communication passage to the second communication passage.

According to another aspect, the present invention provides a chemical liquid control valve for controlling supply of a chemical liquid, comprising: an inlet passage and an outlet passage; a protruding part centrally formed with a first communication passage communicated with the inlet passage; a valve seat provided at an end of the protruding part, the valve seat being formed with a valve port communicated with the first communication passage; a second communication passage provided around the protruding part and allowing communication between the valve port and the outlet passage; and a valve element which is brought into/out of contact with the valve seat; wherein the second communication passage has a bottom surface of a semicircular shape in section.

According to another aspect, the present invention provides a chemical liquid control valve for controlling supply of a chemical liquid, comprising: an inlet passage and an outlet passage; a protruding part centrally formed with a first communication passage communicated with the inlet passage; a valve seat provided at an end of the protruding part, the valve seat being formed with a valve port communicated with the first communication passage; a second communication passage provided around the protruding part and allowing communication between the valve port and the outlet passage; and a valve element which is brought into/out of contact with the valve seat; wherein a sloped portion is formed in a communication bend section between the inlet passage and the first communication passage.

According to the chemical liquid control valve of the present invention, which includes at least one of the barrier provided on the outer circumferential end of the protruding part, the dispersion member provided on the lower surface of the valve element, the second communication passage having the bottom of a substantially semicircular section, and the sloped portion provided in an outer circumferential region of the communication bend section between the inlet passage and the first communication passage. Consequently, the control of supply of the chemical liquid containing particles such as abrasive particles can be performed with the particles being dispersed in the chemical liquid without aggregating.

DETAILED DESCRIPTION OF THE PREFERRED EMBODIMENTS

A detailed description of preferred embodiments of a chemical liquid control valve embodying the present invention will now be given referring to the accompanying drawings. Explained in the following embodiments is the chemical liquid control valve to be used for controlling the supply of slurry (a chemical liquid containing abrasive particles) to a CMP process for semiconductor manufacture.

[First Embodiment]

Figure 1:
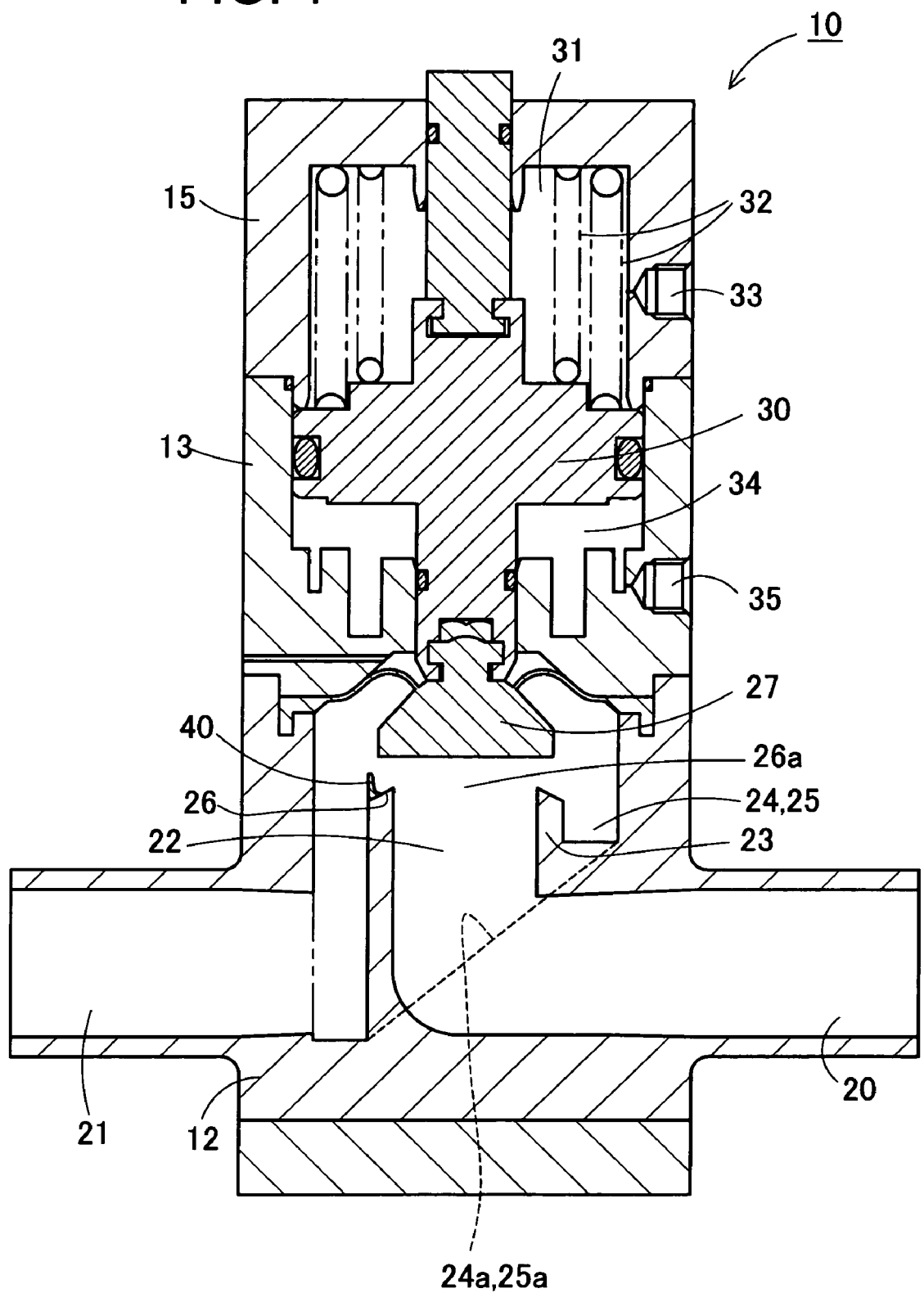
FIG. 1 is a sectional view showing a schematic configuration of a chemical liquid control valve in a first embodiment.
Figure 2:
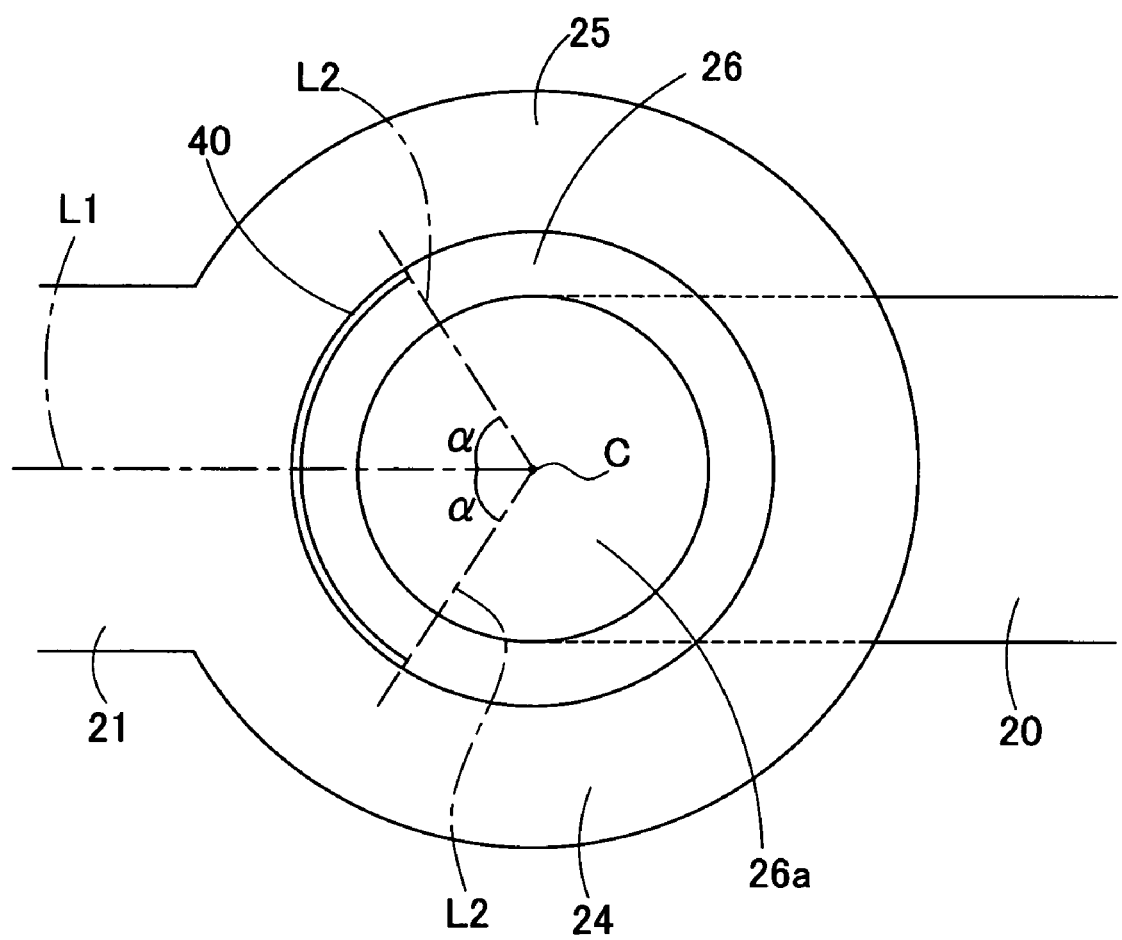
FIG. 2 is a plan view showing a passage configuration of the chemical liquid control valve of FIG. 1.

Firstly, a first embodiment will be described. FIGS. 1 and 2 show a schematic configuration of a chemical liquid control valve in the first embodiment; FIG. 1 is a longitudinal sectional view of the chemical liquid control valve in the first embodiment, and FIG. 2 is a plan view showing a passage configuration of the chemical liquid control valve in the first embodiment.

The chemical liquid control valve 10 in the first embodiment includes a body 12, a cylinder 13, and a cover 15 as shown in FIG. 1. The body 12 is fixedly located on a base plate and is coupled to the cylinder 13. The cover 15 is placed on the cylinder 13.

The body 12 is provided with an inlet passage 20 and an outlet passage 21. Further, the body 12 is centrally formed with a protruding part 23 in which a first communication passage 22 is formed in communication with the inlet passage 20. Second communication passages 24 and 25 communicated with the outlet passage 21 are formed surrounding the protruding part 23 as shown in FIG. 2. These second communication passages 24 and 25 are arranged on both sides of the protruding part 23 (a near side and a far side of the protruding part 23 in FIG. 1) relative to the outlet passage 21. The second communication passages 24 and 25 have bottom surfaces 24a and 25a sloping upwards from the outlet passage 21 side to the inlet passage side 20 at an even angle to avoid direct communication to the inlet passage 20. Accordingly, the second communication passages 24 and 25 are in symmetric relation with respect to the protruding part 23.

As the top of the protruding part 23 is provided a valve seat 26 formed with a valve port 26a communicated with the first communication passage 22. With this configuration, the inlet passage 20 is allowed to be communicated with the outlet passage 21 through the first communication passage 22, the valve port 26a of the valve seat 26, and the second communication passages 24 and 25.

Figure 3:
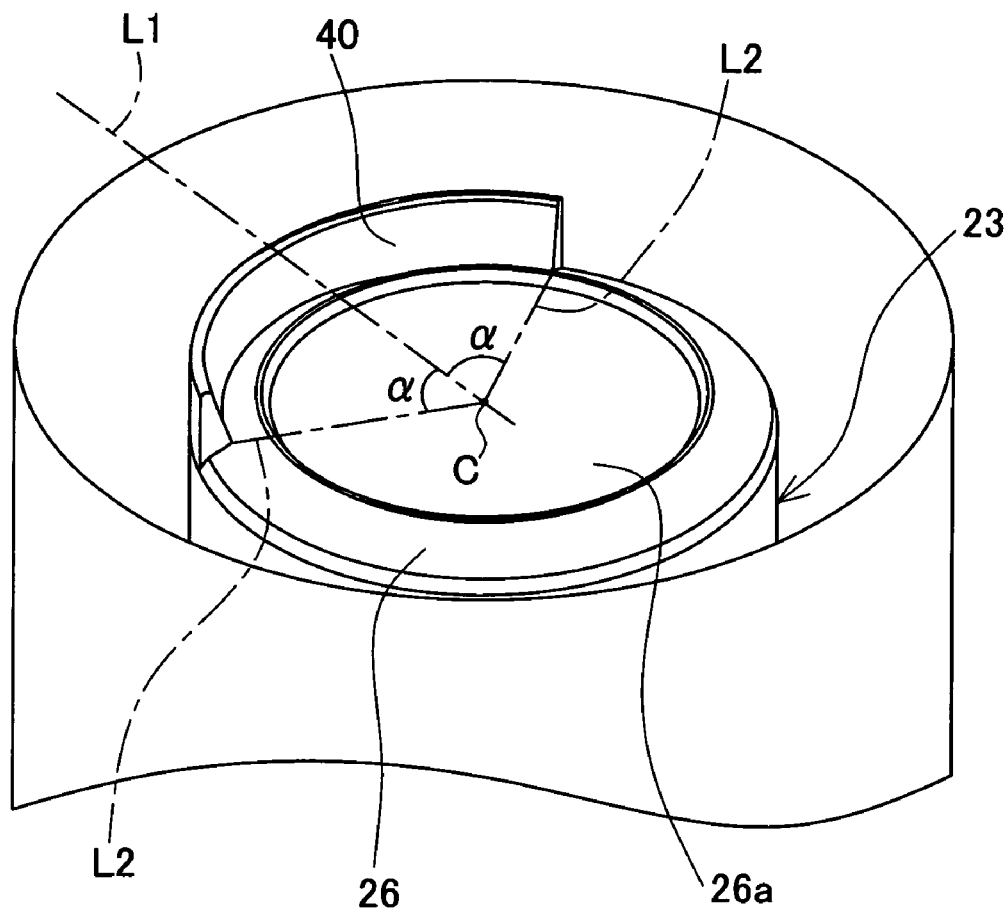
FIG. 3 is a perspective view of a barrier.
Figure 4:
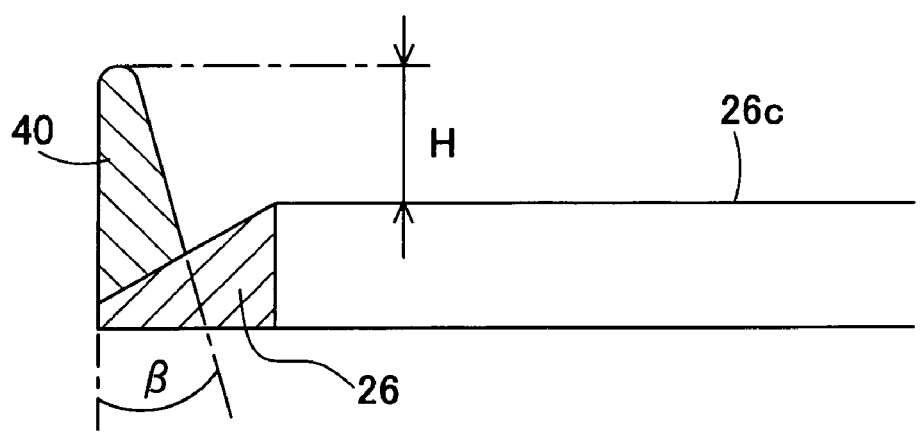
FIG. 4 is a sectional view of the barrier.

Here, a barrier 40 is circumferentially provided on a an outer circumferential end portion of the valve seat 26. This barrier 40 is explained below with reference to FIGS. 3 and 4. FIG. 3 is a perspective view of the barrier and FIG. 4 is a longitudinal sectional view of the barrier. This barrier 40 is of an arcuate wall shape as shown in FIGS. 2 and 3 and positioned on the outlet passage 21 side. The length in a width direction (a circumferential direction) of the barrier 40 may be determined so that an angle $\alpha$ indicated in FIGS. 2 and 3 is in a range of about 30° to 90°. With this configuration, in flowing from the first communication passage 22 to the second communication passages 24 and 25, the chemical liquid is surely allowed to flow in a jet flow toward the upper sides of the second communication passages 24 and 25 while suppressing a decrease in Cv value. It is to be noted that the angle $\alpha$ is an angle formed between a center line L1 of the outlet passage 21 and a line L2 extending between the center of the valve port 26a and each end of the barrier 40.

The barrier 40 is of an upward-tapered section (taper angle: $\beta$) as shown in FIG. 4. With such section of the barrier 40, the chemical liquid flowing from the first communication passage 22 to the second communication passages 24 and 25 is allowed to flow in a jet flow toward the upper sides of the second communication passages 24 and 25. In the present embodiment, the taper angle $\beta$ is approximately 15°.

The height of the barrier 40 may be determined to be higher than a contact surface 26c of the valve seat 26 (i.e., a top of the valve seat 26) which is brought into contact with a diaphragm valve element 27 and lower than the bottom of the diaphragm valve element 27 in a vale full-open state. Preferably, the height H of the barrier 40 relative to the valve-element contact surface 26c of the valve seat 26 is about half of the stroke of the diaphragm valve element 27. This makes it possible to surely form a jet flow of the chemical liquid toward the upper sides of the second communication passages 24 and 25 while suppressing a decrease in Cv value when the chemical liquid flows from the first communication passage 22 to the second communication passages 24 and 25.

The chemical liquid control valve 10 is provided with the barrier 40 having the above shape on the valve seat 26. Accordingly, while suppressing a decrease in Cv value, the jet flow of the chemical liquid toward the upper sides of the second communication passages 24 and 25 can surely be formed when the chemical liquid flows from the first communication passage 22 to the second communication passages 24 and 25. The chemical liquid control valve 10 is thus arranged to disperse the abrasive particles without aggregation in and around the communication area between the first communication passage 22 and the second communication passages 24 and 25 (around the lower part of the valve element 27) during the control of supply of slurry. In the first embodiment, the angle α is about 60° and the height H is about 3 mm (about half the stroke of the diaphragm valve element 27 because the stroke of the diaphragm valve element 27 is designed at about 6 mm).

Returning to FIG. 1, a piston rod 30 is slidably disposed in the cylinder 13. The cover 15 is placed on the cylinder 13. Accordingly, the cover 15, the piston rod 30, and the cylinder 13 form a space 31. In this space 31, a spring 32 urging the piston rod 30 downwardly is placed. The cover 15 is formed with a vent port 33 communicated with the space 31. Under the cylinder 13, a space 34 is formed by the piston rod 30 and the cylinder 13. Further, the cylinder 13 is formed with an operation port 35 communicated with the space 34.

The diaphragm valve element 27 is fixed to the lower end of the piston rod 30. The peripheral edge portion of the diaphragm valve element 27 is held in sandwich relation between the body 12 and the cylinder 13 to sealingly close the second communication passages 24 and 25.

Operations of the chemical liquid control valve 10 having the above structure will be described below. In a normal state (where no compressed air is supplied via the operation port 35), the piston rod 30 is pressed downwards by the urging force of the spring 32 and therefore the diaphragm valve element 27 provided at the lower end of the piton rod 30 is held in contact with the valve seat 26. To be concrete, the diaphragm valve element 27 is in contact with the inner circumferential top of the valve seat 26, interrupting communication between the inlet passage 20 and the outlet passage 21. In this state, slurry is supplied to the inlet passage 20. Since the barrier 40 is positioned on the outer circumferential end of the valve seat 26, the diaphragm valve element 27 will not touch the barrier 40 when the diaphragm valve element 27 is brought into contact with the top of the valve seat 26.

When compressed air is supplied to the space 34 through the operation port 35, the pressure of compressed air exceeds the urging force of the spring 32, thereby moving the piston rod 30 upwards. At this time, the air in the space 31 is partially exhausted to the outside through the vent port 33, and hence the piston rod 30 can be moved upwards smoothly. The diaphragm valve element 27 provided at the lower end of the piston rod 30 is accordingly brought out of contact with the valve seat 26. This allows communication between the inlet passage 20 and the outlet passage 21. Consequently, the slurry supplied into the inlet passage 20 and the first communication passage 22 is allowed to flow into the second communication passages 24 and 25 through the valve port 26a of the valve seat 26 and then supplied to the outlet passage 21.

Since the chemical liquid control valve 10 includes the barrier 40 on the outer circumferential end of the valve seat 26, the slurry is allowed to flow from the first communication passage 22 to the second communication passages 24 and 25 in a jet flow toward the upper sides of the second communication passages 24 and 25 while suppressing a decrease in Cv value. Accordingly, the abrasive particles in the slurry can be dispersed without aggregation in and around the communication area between the first communication passage 22 and the second communication passages 24 and 25 (around the lower part of the valve element 27).

When compressed air is exhausted from the space 34 through the operation port 35 of the body 12, on the other hand, the piston rod 30 is moved down by the urging force of the spring 32, bringing the diaphragm valve element 27 provided at the lower end of the piston rod 30 into contact with the valve seat 26. This interrupts communication between the first communication passage 22 and the second communication passages 24 and 25, thus stopping the supply of slurry to the outlet passage 21. In the above way, the chemical liquid control valve 10 controls the amount of slurry to be fed from the inlet passage 20 to the outlet passage 21.

Figure 5:
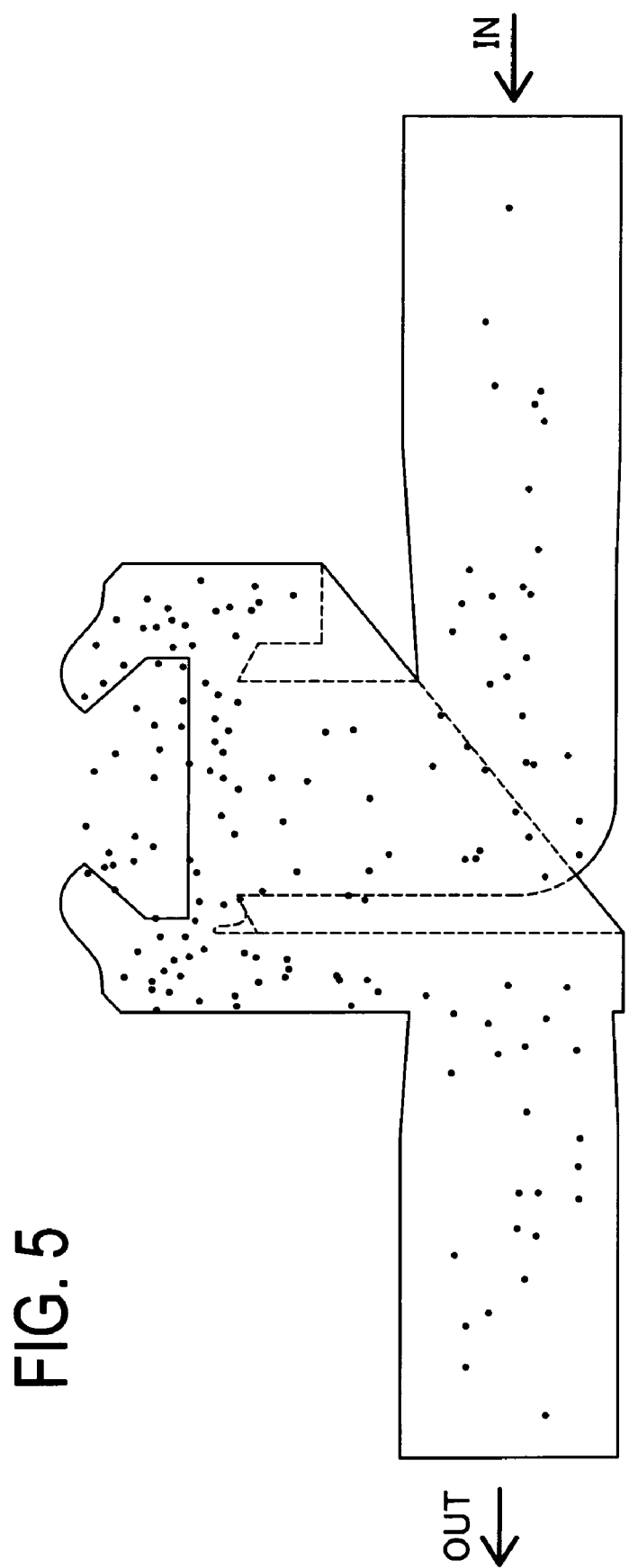
FIG. 5 is a diagram showing a dispersed state of abrasive particles in slurry in the chemical liquid control valve in the first embodiment.
Figure 6:
FIG. 6 is a diagram showing a dispersed state of abrasive particles in slurry in a chemical liquid control valve in a prior art.

The dispersed state of abrasive particles in the slurry was investigated in simulation using the chemical liquid control valve 10 and a conventional chemical liquid control valve (having no barrier 40) in the control of supply of slurry under the same condition. The investigation results are shown in FIGS. 5 and 6. FIG. 5 shows the result obtained with the chemical liquid control valve 10 in the first embodiment. FIG. 6 shows the result obtained with the conventional chemical liquid control valve (no barrier 40). Black dots in FIGS. 5 and 6 represent the abrasive particles.

From FIG. 6, it is found in the conventional chemical liquid control valve (no barrier 40) that the abrasive particles in the slurry aggregated in and around the communication area between the first communication passage 22 and the second communication passages 24 and 25, that is, around the lower part of the diaphragm valve element 27. From FIG. 5, it is found in the chemical liquid control valve 10 in the first embodiment that the slurry particles were dispersed in the upper side of the second communication passages 24 and 25 without aggregation in and around the communication area between the first communication passage 22 and the second communication passages 24 and 25, that is, around the lower part of the diaphragm valve element 27.

In the control of supply of slurry using the chemical liquid control valve 10 in the first embodiment, the abrasive particles to be supplied onto wafers can be prevented from aggregating into large-diameter particles. This makes it possible to prevent serious damage to the wafers during wafer polishing, with the result of enhancement of production yield. The abrasive particles will not aggregate and hence not be deposited and accumulated in the valve and pipes. Therefore, the passages in the control valve and the pipes can be prevented from becoming clogged.

In the chemical liquid control valve 10 in the first embodiment as explained in detail above, the arcuate barrier 40 provided on the outer circumferential end of the valve seat 26 allows the slurry to flow from the first communication passage 22 to the second communication passages 24 and 25 in the jet flow toward the upper sides of the second communication passages 24 and 25 while suppressing a decrease in Cv value (velocity coefficient). For this reason, the abrasive particles in the slurry can be dispersed without aggregation in and around the communication area between the first communication passage 22 and the second communication passages 24 and 25, that is, around the lower part of the valve element 27.

[Second Embodiment]

Next, a second embodiment will be described. A chemical liquid control valve in the second embodiment is substantially equal in basic structure to that in the first embodiment but a dispersion member disposed on the lower surface of the diaphragm valve element instead of providing the barrier. The following explanation is therefore made with a focus on the differences from the first embodiment. Similar parts or members are assigned the same reference numerals and respective explanations are not repeated.

Figure 7:
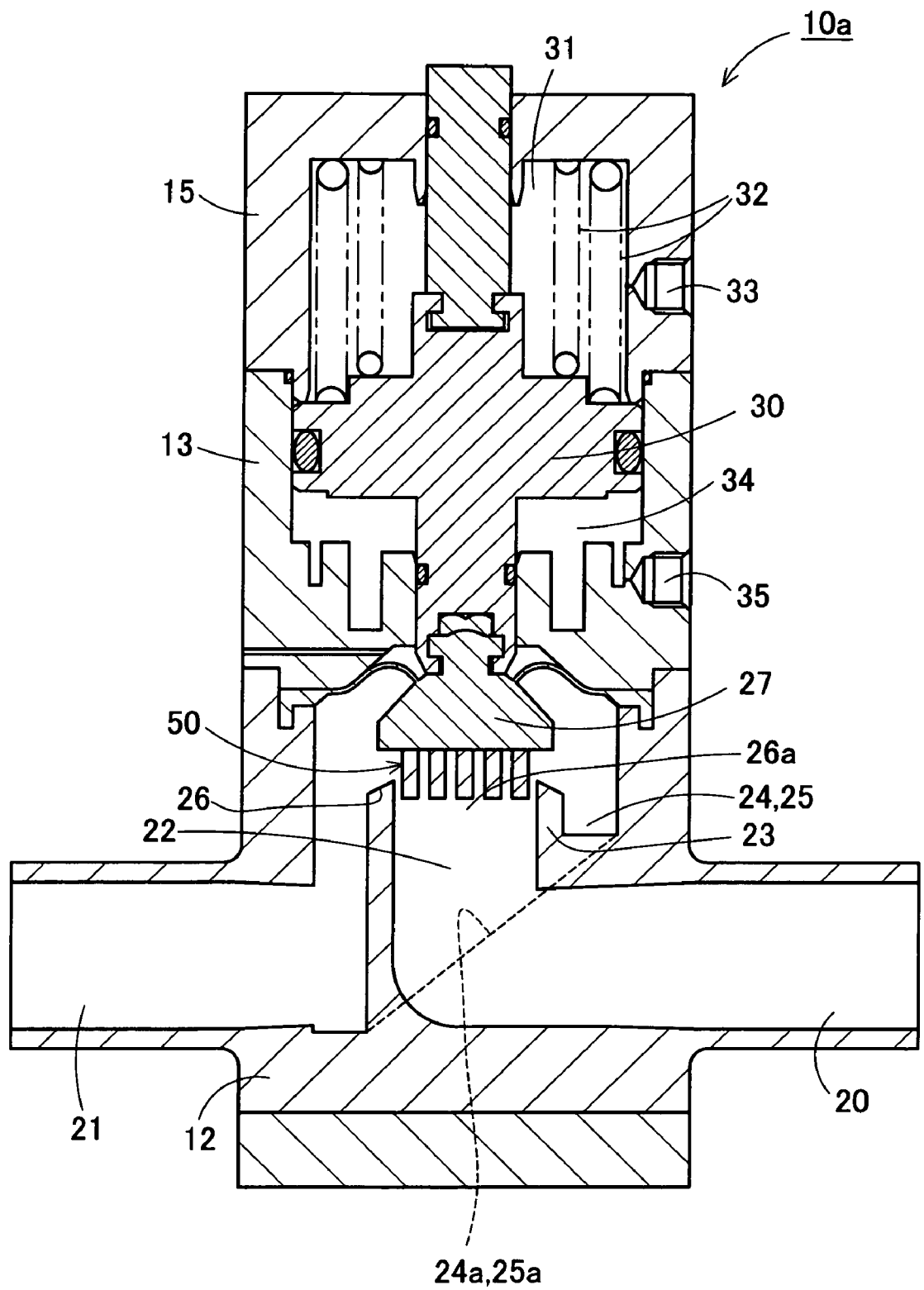
FIG. 7 is a sectional view showing a schematic configuration of a chemical liquid control valve in a second embodiment.
Figure 8:
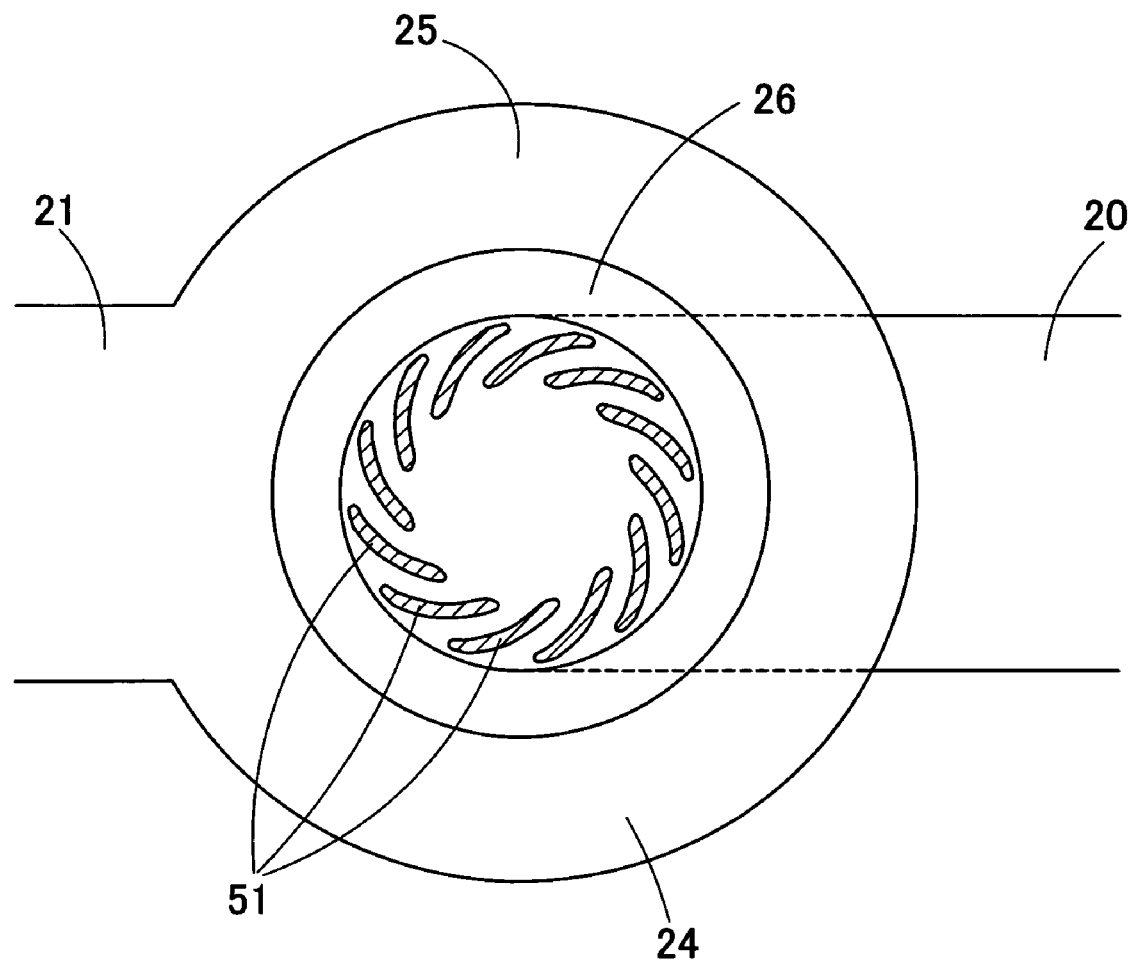
FIG. 8 is a sectional view of a dispersion member.

FIGS. 7 and 8 show a schematic configuration of a chemical liquid control valve in the second embodiment; FIG. 7 is a sectional view of the chemical liquid control valve in the second embodiment, and FIG. 8 is a cross-sectional view of the dispersion member (viewed from the diaphragm valve element 27 side). This chemical liquid control valve 10a is provided with the dispersion member 50 on the lower surface of the diaphragm valve element 27 as shown in FIG. 7. The dispersion member 50 includes twelve impeller blades 51 (similar to the impeller blades of an impeller of a pump or the like) as shown in FIG. 8. The impeller blades 51 serve to disperse the slurry, which is to be supplied from the first communication passage 22 to the second communication passages 24 and 25, entirely around the diaphragm valve element 27 (the upper sides of the second communication passages 24 and 25). The height of the dispersion member 50 is determined so that its end is located in the valve port 26a in the valve full-open state. In case the end of the dispersion member 50 is not located in the valve port 26a in the valve full-open state, it is impossible to allow the slurry to flow into the whole communication area between the first communication passage 22 and the second communication passages 24 and 25, that is, around the lower part of the diaphragm valve element 27.

In the chemical liquid control valve 10a having the above structure, when compressed air is supplied to the operation port 35, bringing the diaphragm valve element 27 out of contact with the valve seat 26, the slurry supplied in the first communication passage 22 through the inlet passage 20 is allowed to flow in the second communication passages 24 and 25 through the valve port 26a of the valve seat 26 and then into the outlet passage 21.

Since the chemical liquid control valve 10a includes the dispersion member 50 on the lower surface of the diaphragm valve element 27, in flowing from the first communication passage 22 to the second communication passages 24 and 25, the slurry strikes on the lower surface of the diaphragm valve element 27 and then flows into the whole area around the diaphragm valve element 27. Accordingly, the abrasive particles in the slurry can be dispersed without aggregating in and around the communication area between the first communication passage 22 and the second communication passages 24 and 25, that is, around the lower part of the diaphragm valve element 27.

Figure 9:
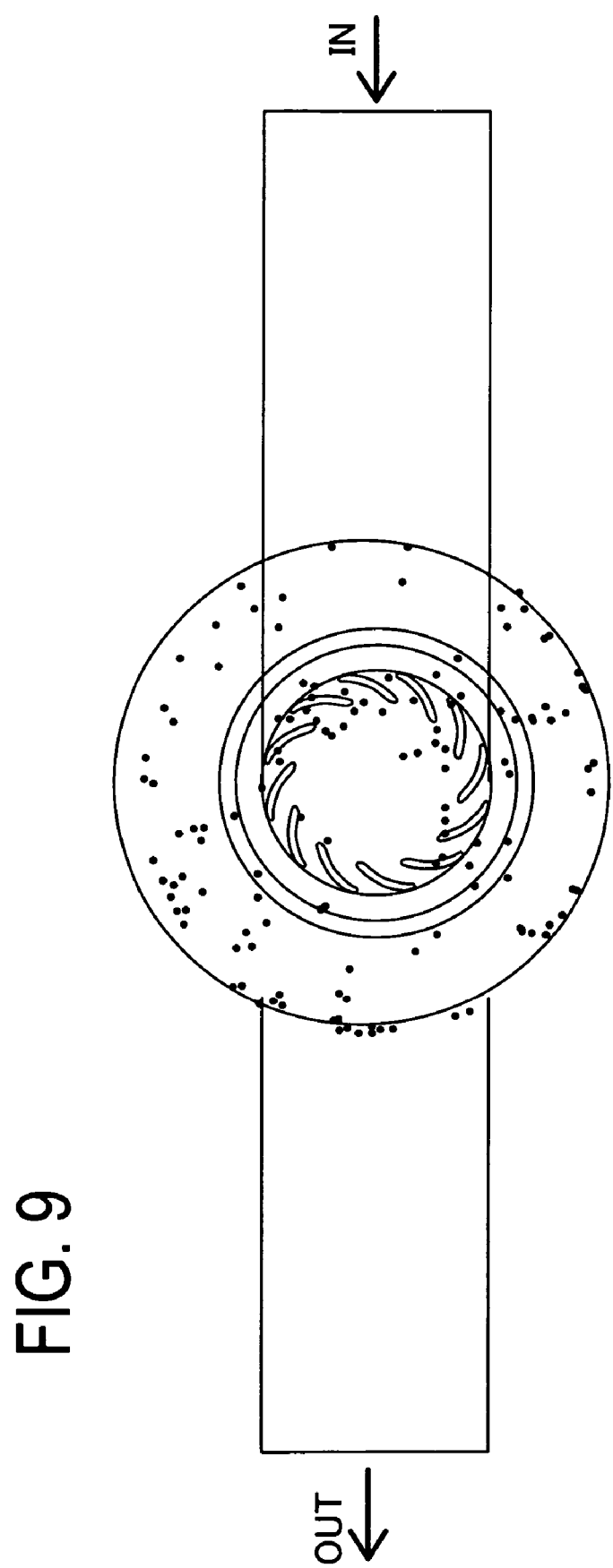
FIG. 9 is a diagram showing a dispersed state of abrasive particles in slurry in the chemical liquid control valve in the second embodiment.
Figure 10:
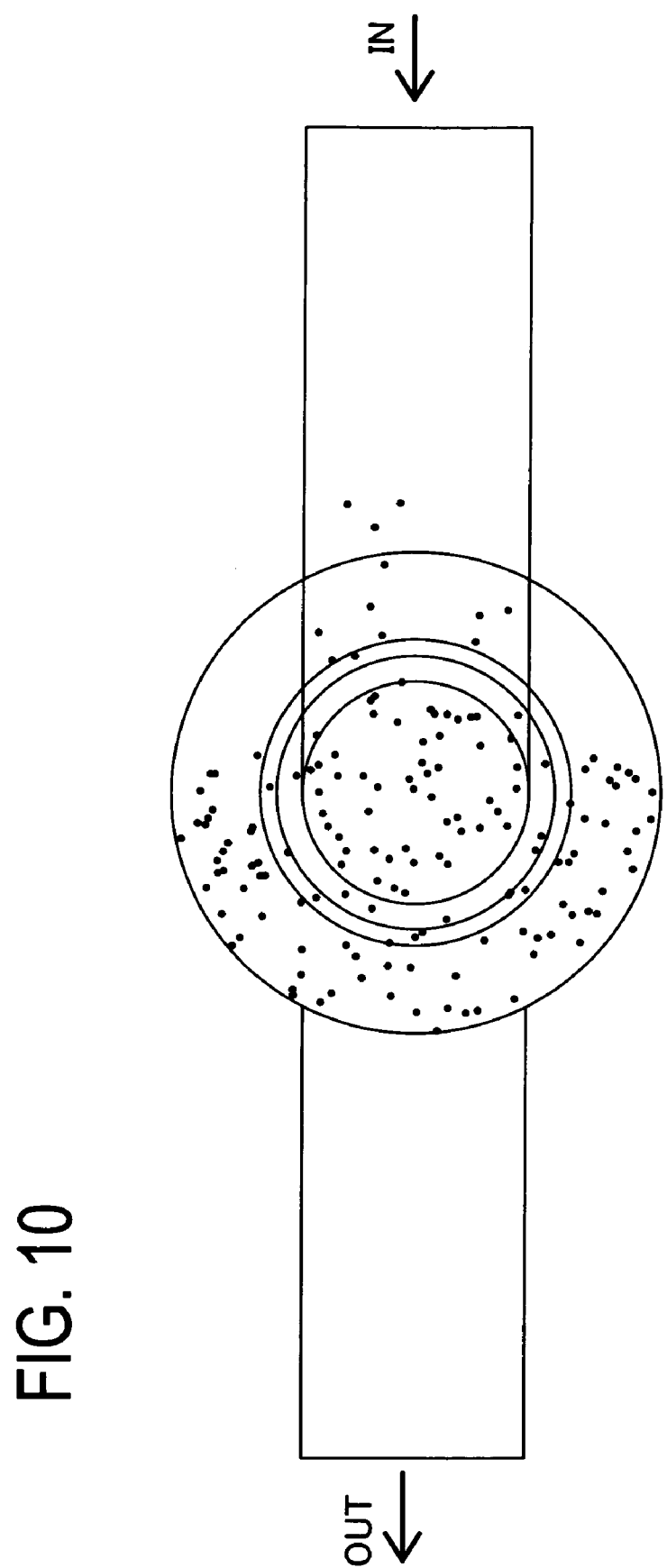
FIG. 10 is a diagram showing a dispersed state of abrasive particles in slurry in the chemical liquid control valve in the prior art.

The dispersed state of abrasive particles in the slurry was investigated in simulation using the chemical liquid control valve 10a and a conventional chemical liquid control valve (having no dispersion member 50) in the control of supply of slurry under the same condition. The test results are shown in FIGS. 9 and 10. FIG. 9 shows the result obtained with the chemical liquid control valve 10a in the second embodiment. FIG. 10 shows the result obtained with the conventional chemical liquid control valve (no dispersion member 50). Black dots in FIGS. 9 and 10 represent the abrasive particles.

From FIG. 10, it is found in the conventional chemical liquid control valve (no dispersion member 50) that the abrasive particles in the slurry presented toward the outlet passage 21 side in and around the communication area between the first communication passage 22 and the second communication passages 24 and 25, that is, around the lower part of the diaphragm valve element 27. From FIG. 9, to the contrary, it is found in the chemical liquid control valve 10a in the second embodiment that the abrasive particles in the slurry were dispersed evenly in the whole communication area between the first communication passage 22 and the second communication passages 24 and 25, that is, around the lower part of the diaphragm valve element 27.

In the control of supply of slurry using the chemical liquid control valve 10a in the second embodiment, the abrasive particles to be supplied onto wafers can be prevented from aggregating into large-diameter particles. This makes it possible to prevent serious damage to the wafers during wafer polishing, with the result of enhancement of production yield. The abrasive particles in the slurry will not aggregate and hence not be deposited and accumulated in the valve and pipes. Therefore, the passages in the control valve and the pipes can be prevented from becoming clogged.

In the chemical liquid control valve 10a in the second embodiment described in detail above, twelve impeller blades 51 are provided on the lower surface of the diaphragm valve element 27. This arrangement allows the slurry to flow from the first communication passage 22 to the second communication passages 24 and 25 in such a way that the slurry first strikes on the lower surface of the diaphragm valve element 27, flows into the whole area around the diaphragm valve element 27, and then to the second communication passages 24 and 25. For this reason, the abrasive particles in the slurry can be dispersed without aggregating in and around the communication area between the first communication passage 22 and the second communication passages 24 and 25, that is, around the lower part of the valve element 27.

[Third Embodiment]

Next, a third embodiment will be described. A chemical liquid control valve in the third embodiment is substantially equal in basic structure to that in the first embodiment but a bottom surface of each second communication passage being substantially semicircular shape, instead of providing the barrier. The following explanation is therefore made with a focus on the differences from the first embodiment. Similar parts or members are assigned the same reference numerals and respective explanations are not repeated.

Figure 11:
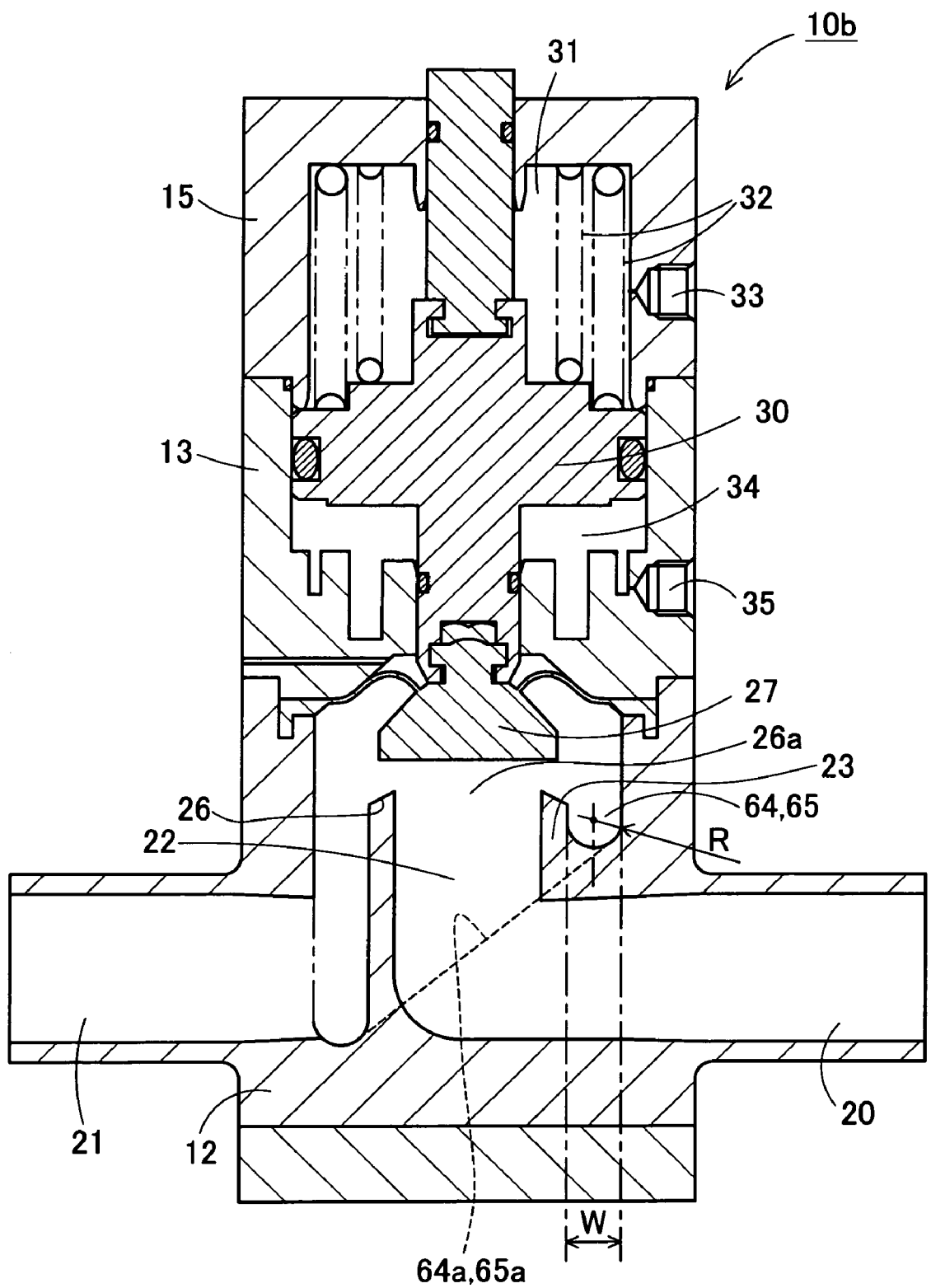
FIG. 11 is a sectional view showing a schematic configuration of a chemical liquid control valve in a third embodiment.

FIG. 11 shows a schematic configuration of a chemical liquid control valve in the third embodiment. FIG. 11 is a longitudinal sectional view of the chemical liquid control valve in the third embodiment. This chemical liquid control valve 10b includes second communication passages 64 and 65 whose bottom surfaces 64a and 65a have a substantially semicircular shape in section. The radius R of each bottom surface 64a and 65a is half the width W of each second communication passage 64 and 65. Accordingly, the sectional shape of each bottom surface 64a and 65a is substantially semicircular. In the present embodiment, W is 10 mm and R is 5 mm.

In the chemical liquid control valve 10b having the above structure, when compressed air is supplied to the operation port 35, bringing the diaphragm valve element 27 out of contact with the valve seat 26, the slurry supplied to the first communication passage 22 through the inlet passage 20 is allowed to flow into the second communication passages 64 and 65 through the valve port 26a of the valve seat 26 and then into the outlet passage 21.

In the above configuration, the bottom surfaces 64a and 65a of the second communication passages 64 and 65 are substantially semicircular in section so that the second communication passages 64 and 65 have no angular corner. Accordingly, no area where the flow velocity of slurry is decreased will be generated in the second communication passages 64 and 65. Consequently, the slurry is allowed to flow through the second communication passages 64 and 65 so that the abrasive particles in the slurry do not remain in the bottom of the second communication passages 64 and 65.

Figure 12:
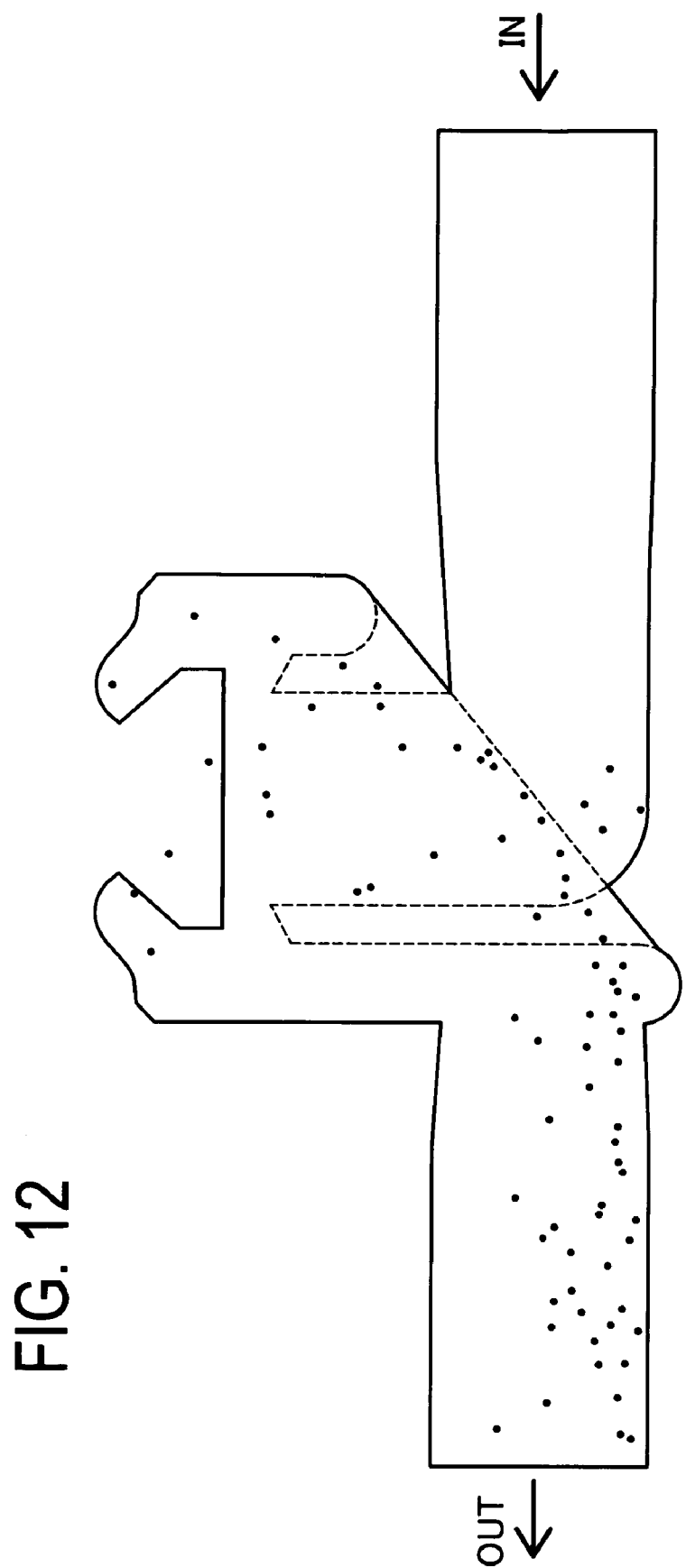
FIG. 12 is a diagram showing a dispersed state of abrasive particles in slurry in the chemical liquid control valve in the third embodiment.
Figure 13:
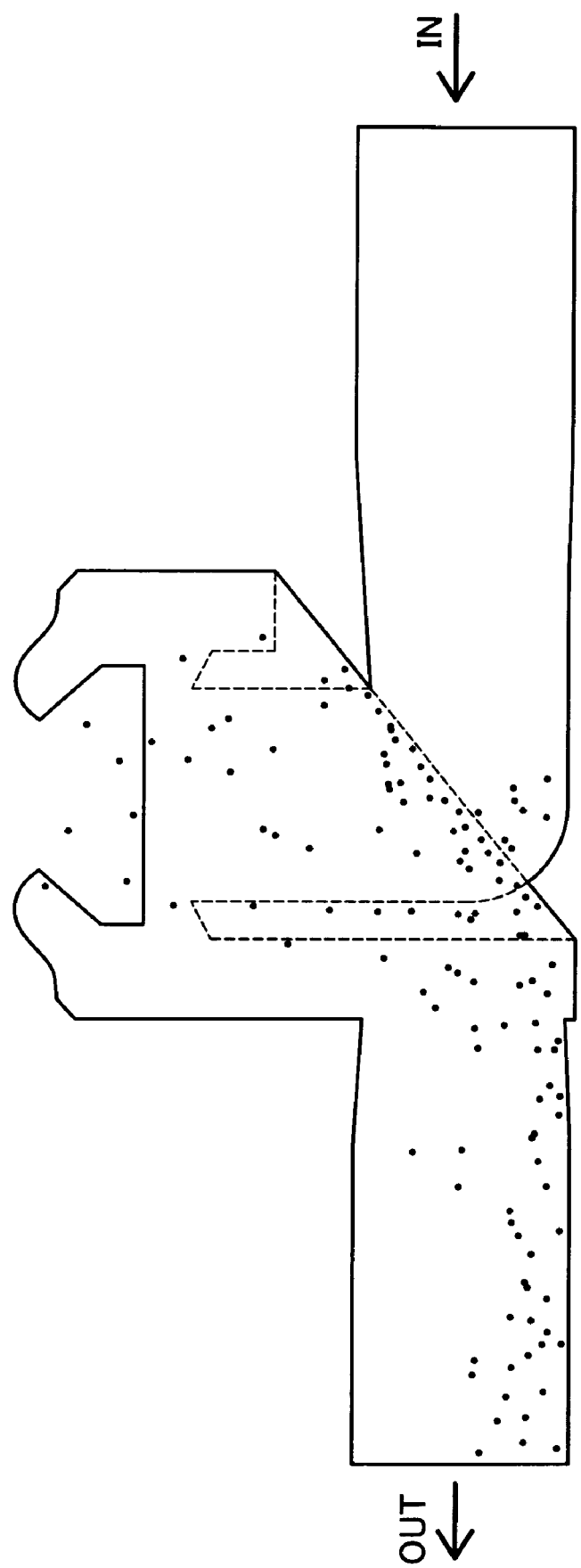
FIG. 13 is a diagram showing a dispersed state of abrasive particles in slurry in the chemical liquid control valve in the prior art.

The dispersed state of abrasive particles in the slurry was investigated in simulation using the chemical liquid control valve 10b and a conventional chemical liquid control valve (the second communication passages having the bottom of a rectangular shape) in the control of supply of slurry under the same condition. The investigation results are shown in FIGS. 12 and 13. FIG. 12 shows the result obtained with the chemical liquid control valve 10b in the third embodiment. FIG. 13 shows the result obtained with the conventional chemical liquid control valve (the second communication passages having the bottom of a rectangular shape). Black dots in FIGS. 12 and 13 represent the abrasive particles.

From FIG. 13, it is found in the conventional chemical liquid control valve (the second communication passages having the bottom of a rectangular shape) that the abrasive particles in the slurry remained in the second communication passages. This is because the flow rate becomes slow in the angular corner of the rectangular bottom of the second communication passages. From FIG. 12, to the contrary, it is found in the chemical liquid control valve 10b in the third embodiment that the abrasive particles in the slurry did not remain in the second communication passages.

In the control of supply of slurry using the chemical liquid control valve 10b in the third embodiment, the abrasive particles to be supplied onto wafers can be prevented from aggregating into large-diameter particles. This makes it possible to prevent serious damage to the wafers during wafer polishing, with the result of enhancement of production yield. The abrasive particles will not aggregate and hence not be deposited and accumulated in the valve and pipes. Therefore, the passages in the control valve and the pipes can be prevented from becoming clogged.

In the chemical liquid control valve 10b in the third embodiment described in detail above, the bottom surfaces 64a and 65a of the second communication passages 64 and 65 are substantially semicircular in section. Accordingly, no area where the flow velocity of slurry is decreased will be generated in the second communication passages 64 and 65. Consequently, the slurry is allowed to flow through the second communication passages 64 and 65 so that the abrasive particles in the slurry do not remain in the bottom of the second communication passages 64 and 65.

[Fourth Embodiment]

Finally, a fourth embodiment will be described. A chemical liquid control valve in the fourth embodiment is substantially equal in basic structure to that in the first embodiment but a sloped portion provided in an outer circumferential region of the communication bend section (on the lower side of the inlet passage) between the inlet passage and the first communication passage. The following explanation is therefore made with a focus on the differences from the first embodiment. Similar parts or members are assigned the same reference numerals and respective explanations are not repeated.

Figure 14:
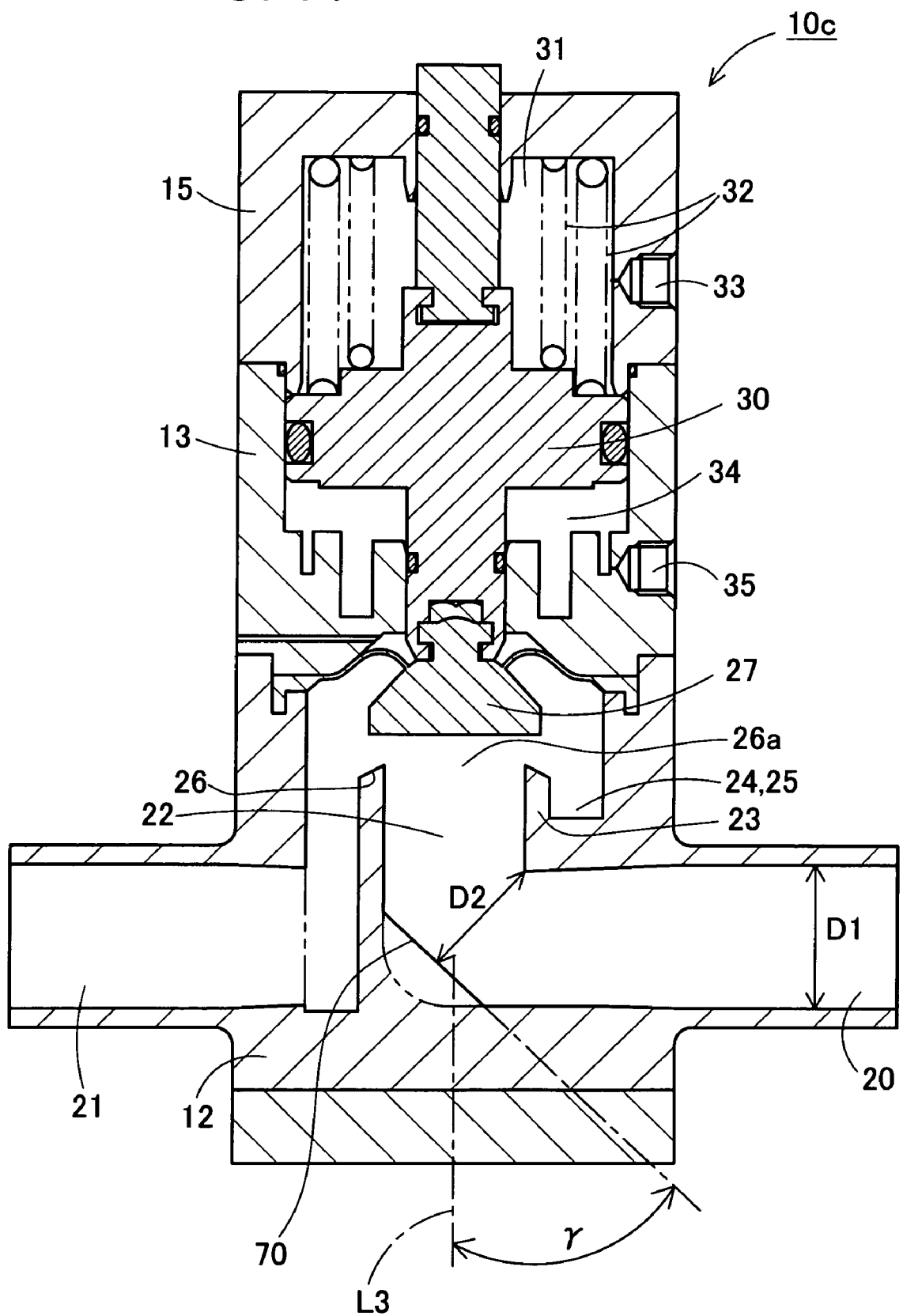
FIG. 14 is a sectional view showing a schematic configuration of a chemical liquid control valve in a fourth embodiment.

FIG. 14 shows a schematic configuration of a chemical liquid control valve in the fourth embodiment. FIG. 14 is a longitudinal sectional view of the chemical liquid control valve in the fourth embodiment. This chemical liquid control valve 10c is provided with a sloped portion 70 in an outer circumferential region of a communication bend section (on the lower side of the inlet passage 20) between the inlet passage 20 and the first communication passage 22 as shown in FIG. 14. The sloping angle γ of this sloped portion 70 may be set in a range of about 30° to 60°. This makes it possible to surely prevent the occurrence of a large accumulation area of slurry in an outer circumferential region of the bend section between the inlet passage 20 and the first communication passage 22. The sloping angle γ of is the angle defined by the center line L3 of the first communication passage 22 and the sloped portion 70, which is about 45° in the present embodiment.

The sloped portion 70 is designed so that the minimum diameter D2 (of the communication bend section) at the sloped portion 70 is substantially equal to the diameter D1 of the inlet passage 20. This configuration makes it possible to prevent the occurrence of a large accumulation area of slurry in the outer area in the bend section between the inlet passage 20 and the first communication passage 22 without decreasing Cv value.

In the chemical liquid control valve 10c having the above structure, when compressed air is supplied to the operation port 35, bringing the diaphragm valve element 27 out of contact with the valve seat 26, the slurry supplied to the first communication passage 22 through the inlet passage 20 is allowed to flow in the second communication passages 24 and 25 through the valve port 26a of the valve seat 26 and then into the outlet passage 21.

Since the sloped portion 70 is provided in the outer circumferential region of the communication bend section between the inlet passage 20 and the first communication passage 22, a large accumulation area of the slurry will not occur in the outer circumferential region of the communication bend section between the inlet passage 20 and the first communication passage 22. Consequently, the abrasive particles in the slurry can be prevented from remaining in the outer circumferential region of the communication bend section between the inlet passage 20 and the first communication passage 22.

Figure 15:
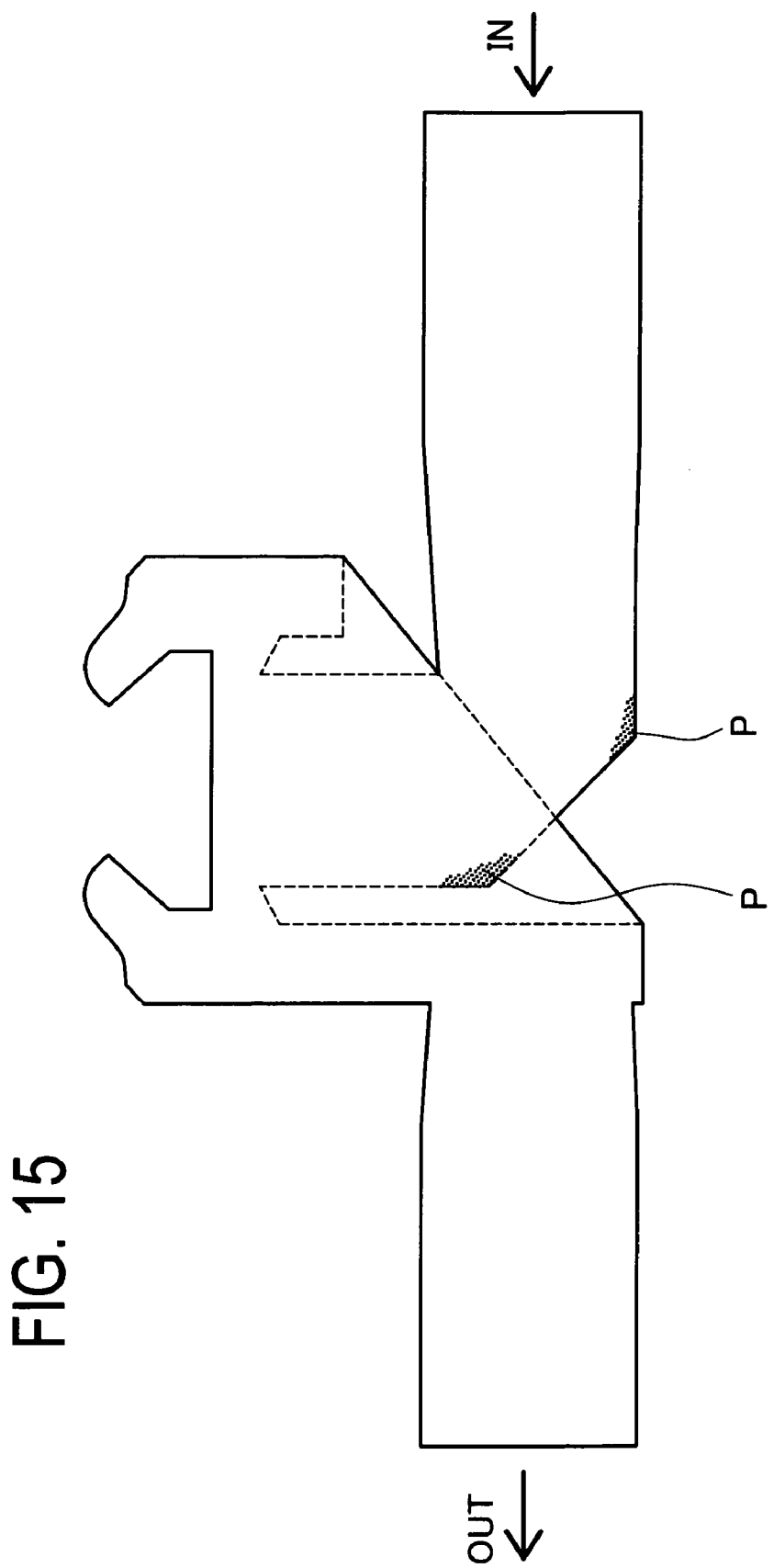
FIG. 15 is a diagram showing an occurrence state of a slurry accumulation area in the chemical liquid control valve in the fourth embodiment.
Figure 16:
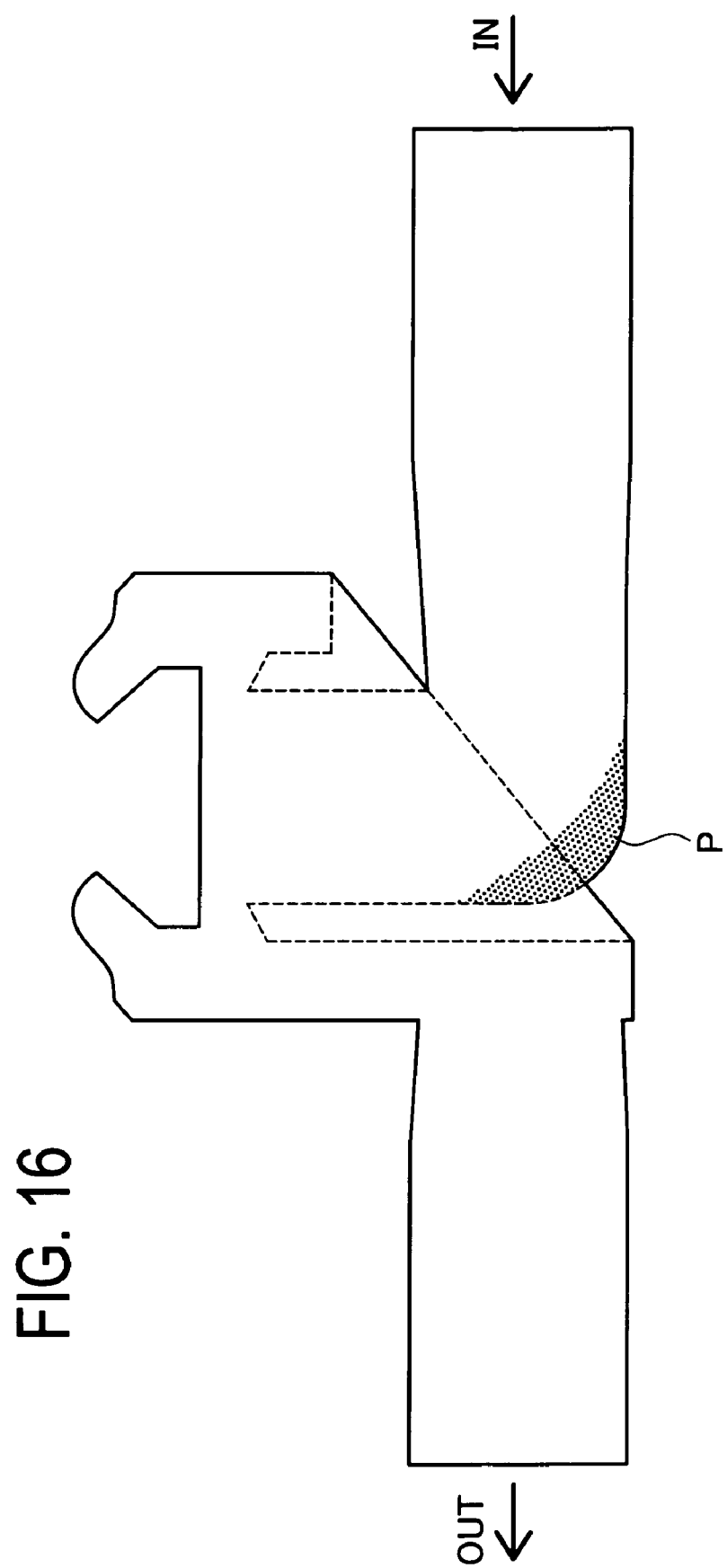
FIG. 16 is a diagram showing an occurrence state of a slurry accumulation area in the chemical liquid control valve in the prior art.
Figure 17:
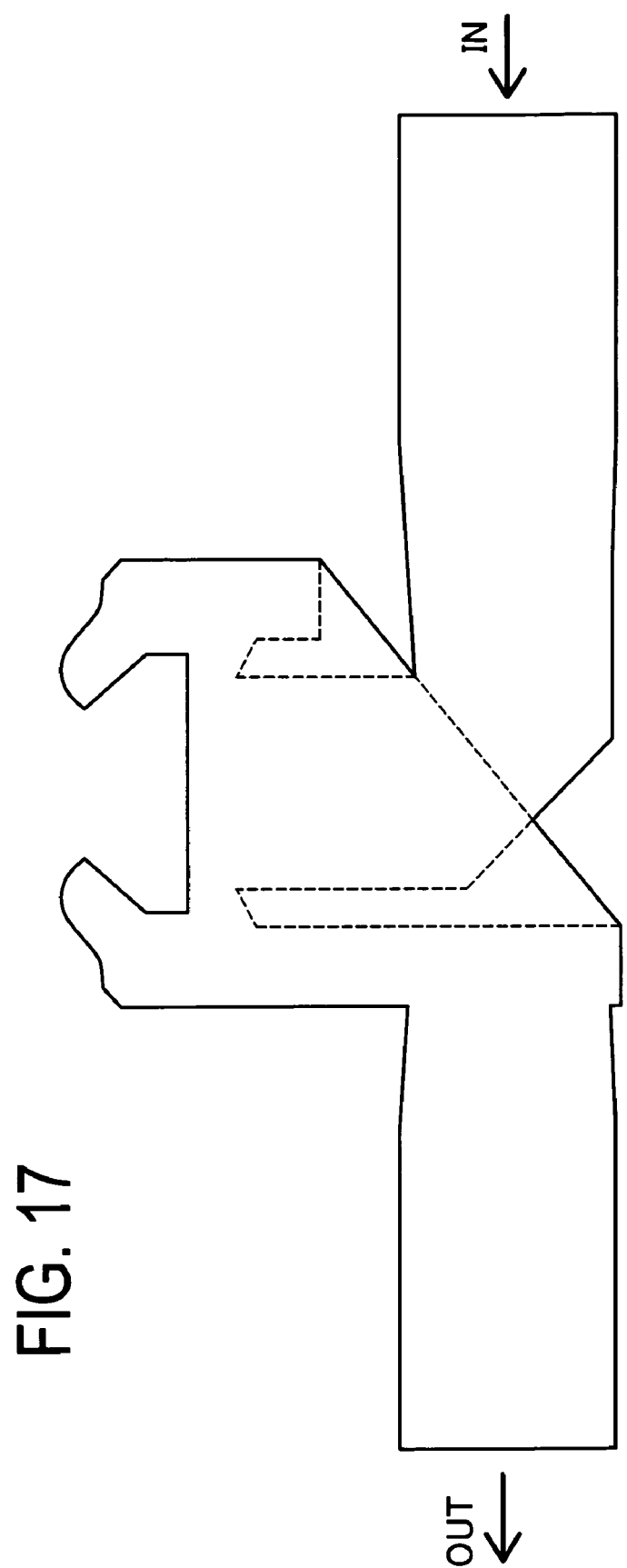
FIG. 17 is a diagram showing a state of residual abrasive particles in the slurry in the chemical liquid control valve in the fourth embodiment.
Figure 18:
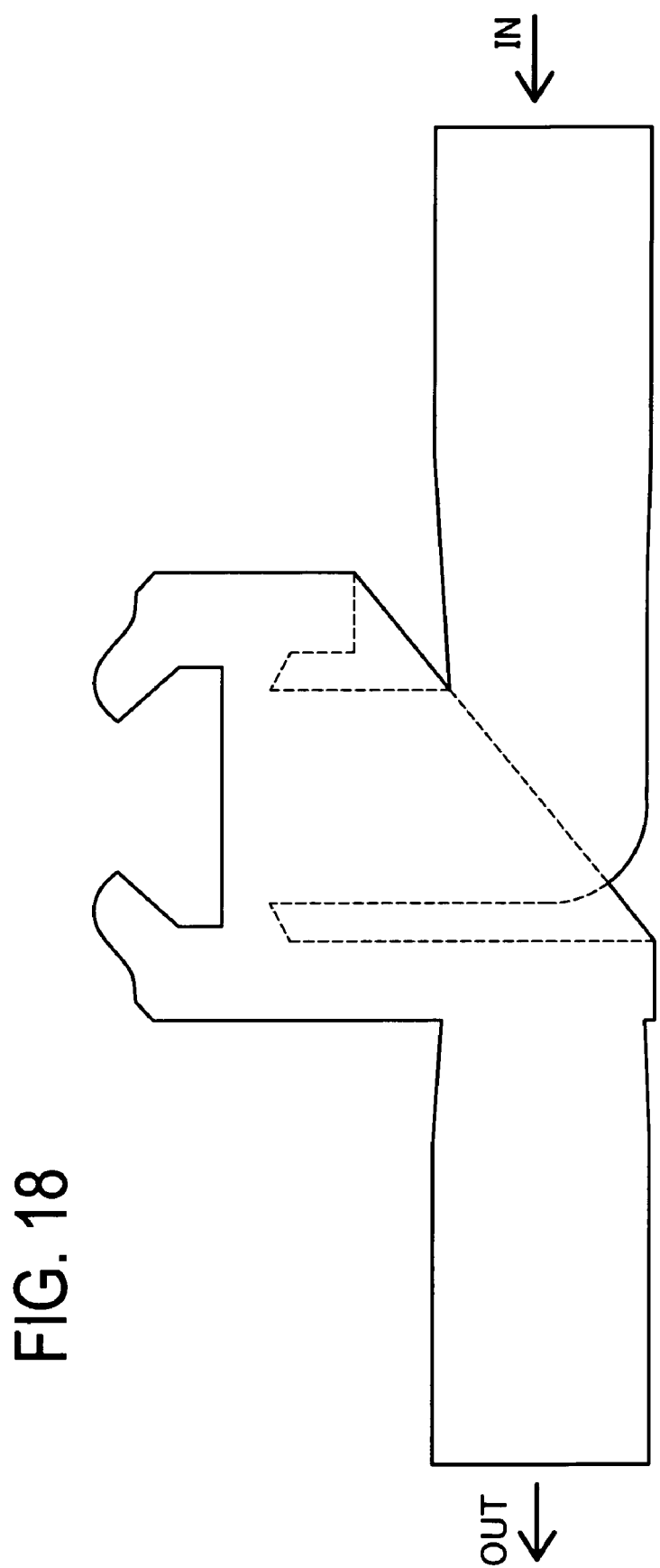
FIG. 18 is a diagram showing a state of residual abrasive particles in the slurry in the chemical liquid control valve in the prior art.
Figure 19:
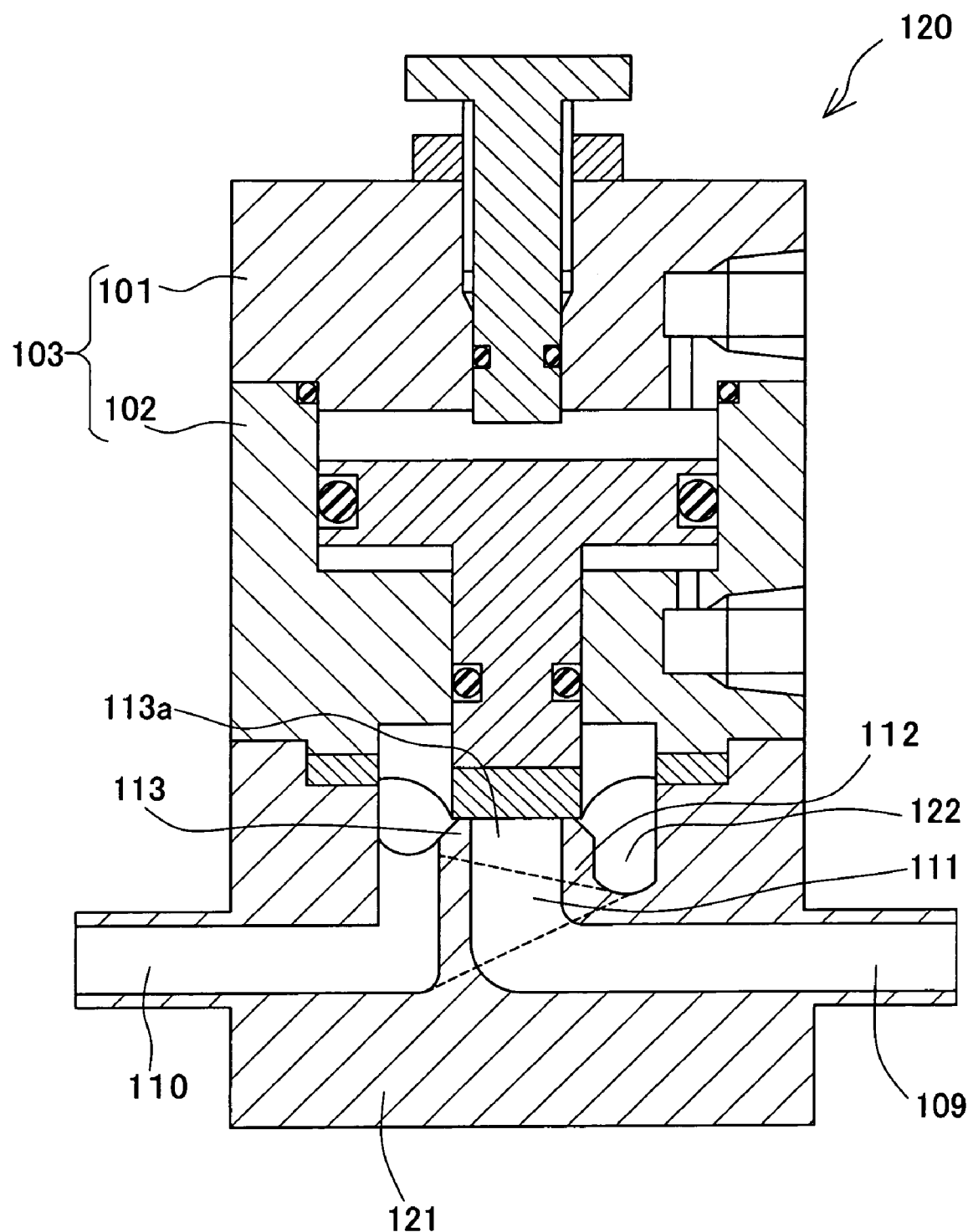
FIG. 19 is a sectional view showing a schematic configuration of the chemical liquid control valve in the prior art.

The occurrence of the slurry accumulation area was investigated in simulation using the chemical liquid control valve 10c and the conventional chemical liquid control valve (having no sloped portion 70) with reference to the velocity distribution of slurry in each valve in the control of supply of slurry under the same condition. The investigation results are shown in FIGS. 15 and 16. Further, the residual state of abrasive particles in the slurry was investigated and the results thereof are shown in FIGS. 17 and 18. FIGS. 15 and 17 show the results obtained with the chemical liquid control valve 10c in the fourth embodiment. FIG. 16 shows the result obtained with the conventional chemical liquid control valve (no sloped portion 70). Black dots in FIG. 18 (FIG. 17) represent the abrasive particles.

From FIG. 16, it is found in the conventional chemical liquid control valve (no sloped portion 70) that a large accumulation area P occurred in the outer circumferential region of the communication bend section between the inlet passage 20 and the first communication passage 22. From FIG. 15, to the contrary, it is found in the chemical liquid control valve 10c in the fourth embodiment that accumulation areas P occurred in the outer circumferential region of the communication bend section between the inlet passage 20 and the first communication passage 22, but the accumulation areas are very small.

From FIG. 18, it is found in the conventional chemical liquid control valve (no sloped portion 70) that the abrasive particles in the slurry remained in the communication bend section between the inlet passage 20 and the first communication passage 22. The reason why the abrasive particles remain in the slurry is in that the large accumulation area P occurred in the outer circumferential region of the communication bend section between the inlet passage 20 and the first communication passage 22 as mentioned above. From FIG. 17, to the contrary, it is found in the chemical liquid control valve 10c in the fourth embodiment that the abrasive particles in the slurry did not remain in the communication bend section between the inlet passage 20 and the first communication passage 22. This is because the very small accumulation areas P merely occur in the outer circumferential region of the communication bend section between the inlet passage 20 and the first communication passage 22.

In the control of supply of slurry using the chemical liquid control valve 10c in the fourth embodiment, consequently, the abrasive particles to be supplied onto wafers can be prevented from aggregating into large-diameter particles. This makes it possible to prevent serious damage to the wafers during wafer polishing with the result of enhancement of production yield. The abrasive particles will not aggregate and hence not be deposited and accumulated in the valve and pipes. Therefore, the passages in the control valve and the pipes can be prevented from becoming clogged.

In the chemical liquid control valve 10c in the fourth embodiment described in detail above, the sloped portion 70 is formed in the outer circumferential region of the communication bend section between the inlet passage 20 and the first communication passage 22. This makes it possible to prevent the occurrence of a large accumulation area of slurry in the outer circumferential region in the communication bend section between the inlet passage 20 and the first communication passage 22. Consequently, the abrasive particles in the slurry can be prevented from remaining in the outer circumferential region of the communication bend section between the inlet passage 20 and the first communication passage 22.

The above embodiments are merely examples and the present invention may be embodied in other specific forms without departing from the essential characteristics thereof. For instance, the first to fourth embodiments are separately structured in the above embodiments, but they may freely be combined.

The above embodiments use the air-operated valve and alternatively may use an electrically-operated valve, an electromagnetic valve, or the like. Further, the above embodiments use the diaphragm valve element and may use a poppet valve or the like.

What is claimed is:

1. A chemical liquid control valve for controlling supply of a chemical liquid, comprising:
    an inlet passage and an outlet passage;
    a protruding part centrally formed with a first communication passage communicated with the inlet passage;
    a valve seat provided at an end of the protruding part, the valve seat being formed with a valve port communicated with the first communication passage;
    a second communication passage provided around the protruding part and allowing communication between the valve port and the outlet passage;
    a valve element which is brought into/out of contact with the valve seat; and
    a barrier provided on a part of an outer circumferential end portion of the protruding part,
    wherein both ends of the barrier are positioned at an angle ($\alpha$) of 30° to 90° with respect to the center line of the outlet passage.

2. The chemical liquid control valve according to claim 1, wherein
    the barrier has a height larger than a contact surface of the valve seat with the valve element and lower than a position of a lower surface of the valve element in a valve full-open state.

3. The chemical liquid control valve according to claim 2, wherein
    the height of the barrier is substantially half of a travel distance of the valve element with reference to the valve-element contact surface of the valve seat.

4. The chemical liquid control valve according to claim 1, wherein the chemical liquid control valve is used for control of supply of slurry containing abrasive particles in a semiconductor manufacturing process.

* * * * *